(12) United States Patent
Bengio et al.

(10) Patent No.: US 8,515,212 B1
(45) Date of Patent: Aug. 20, 2013

(54) IMAGE RELEVANCE MODEL

(75) Inventors: Samy Bengio, Mountain View, CA (US); Erik Murphy-Chutorian, Mountain View, CA (US); Yangli Hector Yee, Sunnyvale, CA (US); Charles Rosenberg, Cupertino, CA (US)

(73) Assignee: Google Inc., Mountain View, CA (US)

( * ) Notice: Subject to any disclaimer, the term of this patent is extended or adjusted under 35 U.S.C. 154(b) by 1048 days.

(21) Appl. No.: 12/505,287

(22) Filed: Jul. 17, 2009

(51) Int. Cl.
*G06F 17/30268* (2006.01)
*G06K 9/66* (2006.01)
*G06K 9/6256* (2006.01)
G06F 17/30265 (2006.01)
G06F 17/30244 (2006.01)
G06F 17/30247 (2006.01)

(52) U.S. Cl.
USPC .... 382/305; 382/155; 382/159; 707/E17.004; 707/E17.019; 707/E17.02; 707/E17.023

(58) Field of Classification Search
USPC ................ 382/305, 155, 159; 707/E17.004, 707/E17.019, E17.02, E17.023
See application file for complete search history.

(56) References Cited

U.S. PATENT DOCUMENTS

| | | | |
|---|---|---|---|
| 5,751,286 A | | 5/1998 | Barber et al. |
| 5,983,237 A | * | 11/1999 | Jain et al. ............... 1/1 |
| 7,111,002 B2 | * | 9/2006 | Zhang et al. ............ 1/1 |
| 7,412,427 B2 | | 8/2008 | Zitnick et al. |
| 7,499,916 B2 | * | 3/2009 | Liu et al. ............... 1/1 |
| 7,773,800 B2 | | 8/2010 | Liu |
| 2007/0179921 A1 | | 8/2007 | Zitnick et al. |
| 2012/0102066 A1 | | 4/2012 | Eronen et al. |

OTHER PUBLICATIONS

Rasiwasia et al., "Query by Semantic Example", CIVR 2006, LNCS 4071, pp. 51-60.*
Carneiro et al., "Supervised Learning of Semantic Classes for Image Annotation and Retrieval", IEEE Transactions on Pattern Analysis and Machine Intelligence, vol. 29 No. 3, Mar. 2007, pp. 394-410.*
Tieu et al., "Boosting Image Retrieval", Proceedings of the IEEE Conference on Computer Vision and Pattern Recognition, vol. 1, 2000, pp. 228-235.*
Grigorova et al., "Content-Based Image Retrieval by Feature Adaptation and Relevance Feedback", IEEE Transactions on Multimedia, vol. 9 No. 6, Oct. 2007, pp. 1183-1192.*
Maji et al. "Classification using Intersection Kernal Support Vector Machines is Efficient." Retrieved from internet http://cs.berkeley.edu, 2008.
Granger et al. "A Discriminative Kernal-based Model to Rank Images from Text Queries." Retrieved from internet http://uchicago.edu, 2008.

* cited by examiner

*Primary Examiner* — Matthew Bella
*Assistant Examiner* — Jose M Torres
(74) *Attorney, Agent, or Firm* — Fish & Richardson P.C.

(57) ABSTRACT

Methods, systems, and apparatus, including computer program products, for identifying images relevant to a query are disclosed. An image search subsystem selects images to reference in image search results that are responsive to a query based on an image relevance model that is trained for the query. An independent image relevance model is trained for each unique query that is identified by the image search subsystem. The image relevance models can be applied to images to order image search results obtained for the query. Each relevance model is trained based on content feature values of images that are identified as being relevant to the query (e.g., frequently selected from the image search results) and images that are identified as being relevant to another unique query. The trained model is applied to the content feature values of all known images to generate an image relevance score that can be used to order search results for the query.

19 Claims, 5 Drawing Sheets

IMAGE RELEVANCE MODEL

BACKGROUND

This specification relates to digital information retrieval, and particularly to processing search results.

The Internet enables access to a wide variety of resources, such as video or audio files, web pages for particular subjects, book articles, or news articles. A search system can identify resources in response to a user query that includes one or more search terms or phrases. The search system ranks the resources based on their relevance to the query and importance and provides search results that link to the identified resources. The search results are typically ordered according to the rank.

The relevance of a resource to a user query can be determined, in part, based on the textual content of the resource or textual content associated with the resource. For example, text included in the content of a resource can be compared to the query to determine whether the resource is relevant to the query. In turn, the resources can be ordered, in part, based on the comparison of the textual content and the query.

While using textual features associated with a resource can provide information by which a search system can determine the relevance of the resource to the query, some resources contain textual content that causes the resource to be improperly identified as relevant to queries. For example, an image of a cake may be associated with a sentence describing the image as "Johnny got a birthday cake" may be identified as a relevant image for a query for "Johnny" even though Johnny does not appear in the image. Thus, search results for images that are selected based solely on textual content associated with the images referenced in the search results may include images that are not relevant to the query.

SUMMARY

In general, one aspect of the subject matter described in this specification can be embodied in methods that include the actions analyzing a plurality of queries, each of the queries being a unique set of one or more query terms received by a search system as a query input; selecting training images for training an image relevance model for each of the queries, the training images including: a first image having a first relevance measure, for the query, that satisfies a first relevance threshold; and a second image having a second relevance measure, for a different query in the plurality of queries, that satisfies a second relevance threshold. Content feature values are identified for each training image, where each content feature value represents a characteristic of an aspect of the training image. The image relevance model is trained to generate relevance measures of content feature values of images to the query based on the content feature values of the training images. Other embodiments of this aspect include corresponding systems, apparatus, and computer program products.

These and other embodiments can optionally include one or more of the following features. The first relevance measure can be based on selections of the first plurality of images when provided in response to the query. The second relevance measure can be based on selections of the second plurality of images when provided in response to the different unique query. The image relevance model can be a vector of weights corresponding to the content feature values.

The image relevance model can be generated by a method that includes the actions initializing the vector of weights to default values; generating a first training score based on an image relevance model and the content feature values of the first image; generating a second training score based on the image relevance model and the content feature values of the second image; comparing the first training score and the second training score; in response to a difference between the first training score and the second training score not satisfying a training score margin, adjusting values of the vector of weights.

The actions of selecting training images, generating the first training score, generating the second training score and comparing can be iteratively repeated until a training condition occurs. In response to the training condition occurring, the image relevance model as trained. The first training score can be determined based on a dot product of the vector of weights and the content feature values of the first images.

The methods can further include the actions for each query: identifying a plurality of images; for each image: applying the image relevance model to content feature values of the image; and assigning an image relevance score to the image based on the application of the image relevance model to the content feature values, the image relevance score being a relevancy measure of the image, for the query; receiving second query data defining a query; and accessing the image relevance scores of the images for the query to identify a third plurality of images that are relevant to the query based on the image relevance model and content feature values.

Particular embodiments of the subject matter described in this specification can be implemented so as to realize one or more of the following advantages. Image search results responsive to a search query can be more accurately ordered according to an image relevance model based on a relevancy of content feature values of images, for the query. Image search results are more efficiently retrieved because an independent model is trained for each unique query. The quality of image search results is increased because the image relevance scores for nearly identical images are adjusted so that more visually diverse images are presented in response to a query.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
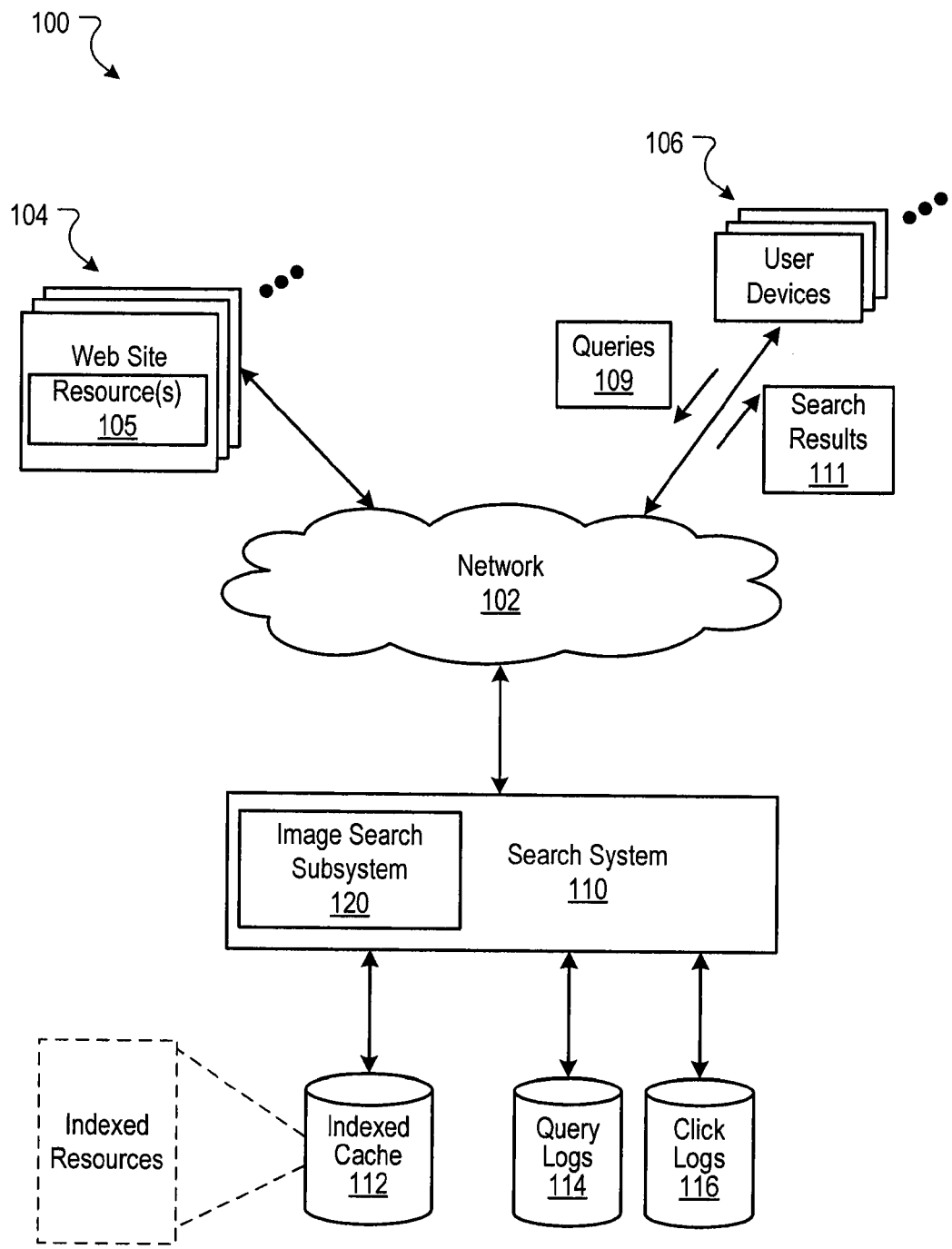
FIG. 1A is a block diagram of an example environment in which a search system provides search services.

FIG. 1A is block diagram of an example environment 100 in which a search system 110 provides search services. A computer network 102, such as a local area network (LAN), wide area network (WAN), the Internet, or a combination thereof, connects web sites 104, user devices 106, and the search system 110. The online environment 100 may include many thousands web sites 104 and user devices 106.

A web site is a one or more resources 105 associated with a domain name, and each web site is hosted by one or more servers. An example web site is a collection of web pages formatted in hypertext markup language (HTML) that can contain text, images, multimedia content, and programming elements, such as scripts. Each web site 104 is maintained by a publisher, e.g., an entity that manages and/or owns the web site.

A resource is any data that can be provided by the web site 104 over the network 102 and that is associated with a resource address. Resources include HTML pages, word processing documents, and portable document format (PDF) documents, images, video, and feed sources, to name just a few. The resources can include content, such as words, phrases, images and sounds and may include embedded information (such as meta information and hyperlinks) and/or embedded instructions (such as JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

As there are many thousands of web sites, there are millions of resources available over the network 102. To facilitate searching of these resources, the search system 110 identifies the resources by crawling the web sites 104 and indexing the resources provided by the web sites 104. Data about the resources can be indexed based on the resource to which the data corresponds. The indexed and, optionally, cached copies of the resources are stored in an indexed cache 112.

The user devices 106 submit search queries 109 to the search system 110. Each query is a unique set of one or more query terms received by a search system 110 as a query input. In response, the search system 110 uses the indexed cache 112 to identify resources that are relevant to the queries. The search system 110 identifies the resources in the form of search results 111 and returns the search results 111 to the user devices 106 in search results pages. A search result 111 is data generated by the search system 110 that identifies a resource that satisfies a particular search query, and includes a resource locator for the resource. An example search result 111 can include a web page title, a snippet of text or a portion of an image extracted from the web page, and the URL of the web page.

The search results are ranked based on scores related to the resources identified by the search results, such as information retrieval ("IR") scores, and optionally a separate ranking of each resource relative to other resources ("page rank"). In some implementations, the IR scores are computed from dot products of feature value vectors corresponding to a query and a resource, and the ranking of the search results is based on relevance scores that are a combination of the IR scores and page quality scores. The search results 111 are ordered according to these relevance scores and provided to the user device according to the order.

The user devices 106 receive the search results pages and render the pages for presentation to users. In response to the user selecting a search result at a user device 106, the user device 106 requests the resource identified by the resource locator included in the selected search result. The web site 104 hosting the resource receives the request for the resource from the user device 106 and provides the resource to the requesting user device 106.

The queries submitted during the user sessions are stored in query logs 114. Selection data defining actions taken responsive to search results provided for the search sessions are stored in click logs 116. These actions can include whether a search result was selected. The query logs 114 and click logs 116 can be used to map queries submitted during search sessions to resources that were identified in search results and the actions taken by users. If time data are also stored, then the relative times at which those actions were taken can also be determined. The click logs and query logs can be used to map queries submitted during search sessions to resources that were identified in response to the queries and that were selected by the users of the user devices 106.

Image Search Subsystem

The search system 110 includes an image search subsystem 120 to provide search results for images. The image search subsystem 120 ranks image search results based on a relevance measure of images to a search query. In some implementations, the image search subsystem 120 is configured to process each search query as a whole and not as constituent parts. Thus, as used in the context of the image search subsystem 120, a query is one or more terms that are input by users of the user devices 106 and received by the search system 110 as a query input for a search operation, and is not the constituent terms that make up the query. For example, the queries "dolphin", "exhibits", and "dolphin exhibits" are three separate and unique queries in the context of the image search subsystem 120.

In some implementations, query data and click data are stored in the query logs 114 and click logs 116 for each unique query submitted by users. The query data are data that define queries of one or more words that were received, for example, as search queries 109. For example, if the queries "dolphin", "exhibits", and "dolphin exhibits" are each received by the search system 110, then query data and click data are stored in the query logs 114 and click logs 116 for each of the queries "dolphin", "exhibits", and "dolphin exhibits".

Image Relevance Model

Because the image search subsystem 120 processes each search query as a whole, it can create a corresponding image relevance model for each query. When selecting images for reference in image search results responsive to a particular query, the image search subsystem 120 calculates the relevance measures based on an image relevance model that is associated with that particular query.

Before the image relevance models can be used, they must first be trained by the image search subsystem 120. At a high level, the image search subsystem 120 trains an image relevance model for each query by first selecting images that are relevant to that query and other images that are relevant to other queries. In some implementations, feature values for each image are extracted and are transformed into a sparse representation using a precomputed dictionary of visual terms that represent a set of regions having similar feature values. The extraction and transformation yields a "bag of features" for the image.

Thereafter, an image relevance model for each query is learned. The image relevance model is of the form that generates a score for an image based on the sparse representation of the image, e.g., $$IRS = W * X$$

where IRS is an image relevance score, X is a sparse vector of feature values representing an image, and W is a vector of parameters learned for the model.

To select training images, the image search subsystem 120 identifies images as being relevant to a query based on a relevance measure between the image and the query. In some implementations, the relevance measure is based on a relevance feedback score. The relevance feedback score is a relevance measure that is generated based on user actions in response to an image appearing in search results. For example, click data specifying a number of times an image was selected from search results for a query can represent a measure of the relevance of the image to the query. The image search subsystem 120 can derive the relevance measure from the click logs 114 and query logs 116.

The image relevance model is trained to determine the relevance of an image to a query based on content feature values of images for which a relevance feedback score is available. In turn, the image relevance model can be applied to content feature values of other images to determine a relevance score for the other images relative to the query.

The image search subsystem 120 applies an independent image relevance model to content feature values of the images for each unique query that is identified by the image search subsystem 120. Using a separate image relevance model for each query rather than using an image relevance model for each constituent term in the query reduces the overhead associated with identifying search results for a query. For example, the image relevance models for each query can be trained independently and in parallel, as they are not required to consider the output of other image relevance models for other queries. Additionally, only one image relevance model need be processed for each query, which reduces resources when selecting images to reference in image search results for a query.

Training Image Relevance Models

Figure 1B:
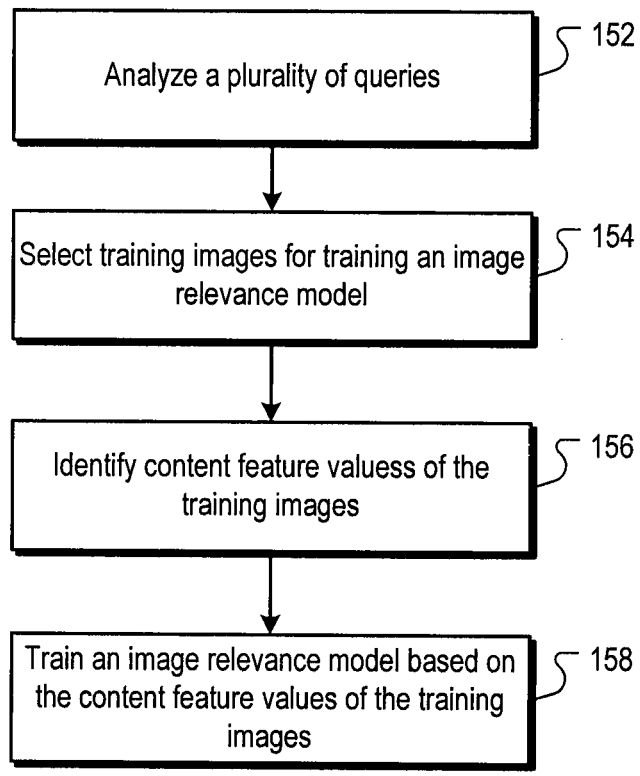
FIG. 1B is a flowchart of an example process for generating an image relevance model.

FIG. 1B is a flowchart of an example process 150 for generating an image relevance model. According to the process 150 of FIG. 1B, the image search subsystem 120 identifies queries for which an image relevance model is to be trained by accessing and retrieving, or otherwise receiving, query data from a query log (152).

According to the process 150, the image search subsystem 120 selects training images for training an image relevance model for each unique query (154). In some implementations, the training images selected for a query include images identified as being relevant to the query and images that are identified as being relevant to other unique queries. For example, the training images can include images that are relevant to the query "dolphin" as well as images that are relevant to the query "train." Including images that are relevant to the query as well as images that are relevant to another unique query enables the model to be trained with content feature values of images are relevant to the query as well as images that are likely not relevant to the query. Training the image relevance model with images that are identified as relevant to another unique query, rather than images that are identified as an not being relevant to the query, increases the likelihood that the quality of the image being used to train the image relevance model is higher than images that might otherwise be used to train the image relevance model.

In some implementations, the image search subsystem 120 can identify images that are relevant to a query based on a relevance threshold for the query. The relevance threshold is a minimum relevance measure between the image and the query used to identify an image that is relevant to a query. For example, the image search subsystem 120 can identify images that have been selected from image search results for the query a minimum number of times (e.g., at least 10 times) as being relevant to the query. Other relevance thresholds can also be used. For example, the image search subsystem 120 can identify images as being relevant to the query based on selection of the images from search results a minimum percentage of a total number of times the search results are presented. The relevance threshold for each unique query can be globally set or individually set or adjusted.

According to the process 150, the image search subsystem 120 accesses the indexed cache 112 to identify the content feature values for each of the identified training images (156). The image relevance model for each unique query is trained based on content feature values of training images that are identified for the unique query. In some implementations, content feature values of training images for a unique query can be accessed in the indexed cache 112. A content feature value of an image is a visual characteristic of a portion of the image. Example content feature values include color, texture, edges and other characteristics of a portion of the image. The content feature values can be extracted, for example, from the images during the crawling that is performed by the search system 110 or the image search subsystem 120. Example processes for extracting content feature values include scale-invariant feature transform, edge detection, and corner detection.

In some implementations, the indexed cache 112 includes content feature values for an image when presented at different scales. For example, a first set of content feature values may be extracted from the full scale of the image as it is presented to a user device, while other sets of content feature values may be extracted at 75%, 50%, and 25% of the full scale of the image. The content feature values that are identified for the image at each scale can all be indexed with the image in the indexed cache 112. For example, the content feature values for an image can be indexed by storing the content feature values at a memory location that is associated with the image.

In some implementations, the content feature values that are extracted from images can be indexed according to feature categories. Feature categories are a predefined set of reference feature values with which content feature values that are sufficiently similar can be categorized, even though the individual content feature values may vary slightly. For example, similar content feature values can be categorized in the same feature category even though slight variations exist in the illumination or color of the images from which content feature values were identified.

The content feature values of images can be indexed by feature categories based on a frequency with which the content feature values occur in various scaled versions of the image. The content feature values can be indexed by feature category without reference to spatial relation of the feature values in the image. Indexing the content feature values without a reference to the spatial relation of the feature values in the image results in a "bag of feature values" for the image. The bag of feature values for the image includes a frequency of content feature values that satisfy each feature category without considering where each of the content feature values occurs in image. Therefore, each image is characterized by frequency distribution of the feature categories in which the content feature values are categorized. Indexing content feature values of images as "a bag of feature values" facilitates characterization of an image without regard to the scale of the image. Throughout this document, the term "content feature value" refers to content feature values that have been indexed based on feature categories without reference to the spatial relation of the feature values (e.g., "a bag of feature values").

In some implementations, the feature categories can be defined based on a sparse vector of discrete content feature values. The discrete content feature values are learned, for example, based on k-means clustering of content feature values that are extracted from a set of training images. For example, edge histograms (texture content feature values)

and color histograms (color content feature values) can be generated for a top 10,000 most selected images.

The content feature values can be extracted from each of a plurality of overlapping square portions of each image. The edge histograms are based on differences in intensities of circular portions of the image that are centered at each pixel, referred to as a center pixel, of the square portions. For each circular portion, an intensity of the center pixel is compared to interpolated intensities of pixels that are located at eight equally spaced locations on an outer edge of the circular portion. Each of the pixels is determined to have a lower or greater intensity than the center pixel, and is assigned a respective 0 or 1 binary value based on the determination.

The eight binary values provide an eight-bit sequence that represents the texture of the circular portion. This eight-bit binary sequence can be represented as a 256-bin histogram. However, the bins corresponding to non-uniform sequences (i.e., sequences having more than two 1 to 0 or 0 to 1 transitions) can be merged, thereby allowing each of the 256 bin histograms to be mapped to 59 bin histograms, thereby resulting in a sparse representation of the texture content feature value.

The color histograms for each pixel are generated based on k-means clustering. A color codebook is learned from red-green-blue pixels of training images, and a color histogram for a square portion of the image is determined by mapping each pixel in the square portion to the color to which the pixel most closely corresponds.

The edge histograms and color histograms for an image can be represented as a sparse vector of feature values by mapping each vector of image feature values to a discrete index (i.e., feature category), referred to as a visual term. First, concatenated vectors are generated by concatenating each pair of vectors that represent the edge and color histograms, respectively. Then each concatenated vector for an image is mapped to a corresponding visual term. The visual term to which a concatenated vector corresponds is determined, for example, based on relationships that have been identified between the concatenated vectors visual terms.

Relationships between the concatenated vectors and the visual terms are identified, for example, by training a machine learning algorithm using the concatenated vectors of content feature values for the training images based on k-means clustering. The weight of each visual term can be determined for example, based on relationship (1)

$$p_i = \frac{f_i * idf_i}{\sqrt{\sum_{j=1}^{|C|} (f_j * idf_j)^2}} \quad (1)$$

Where,
$p_i$ is the weight of the visual term i in the an image p;
$f_i$ is the frequency of the visual term i in the image p;
$f_j$ is the frequency of the visual term j in the image p;
$idf_i$ is the inverse document frequency of visual term i, defined as $-\log(r_i)$, where $r_i$ is a fraction of training images containing at least one occurrence of visual term i;
$idf_j$ is the inverse document frequency of visual term j, defined as $-\log(r_j)$, where $r_i$ is a fraction of training images containing at least one occurrence of visual term j; and
$|C|$ is the set of visual terms Relationship (1) provides visual term weights that normalize the sparse vector that results from mapping each the concatenated vectors for an image to visual terms. The normalization emphasizes concatenated vector values that correspond to rare visual terms (i.e., visual terms that appear in less than a threshold portion of all images) and de-emphasizes concatenated vector values that correspond to common visual terms (i.e., visual terms that appear in more than a threshold portion of all images). Thus, according to relationship (1), the less frequent a visual term appears in a corpus of images, the more informative the visual term is, and in turn, the higher the weight that the visual term receives.

According to the process 150, the image relevance model search subsystem 120 trains the image relevance model for each unique query based on the content feature values of the training images (158). Generating the image relevance model includes training the image relevance model to be predictive of the relevance of content feature values of images to the query. In some implementations, the image relevance model is implemented as a passive-aggressive model for image retrieval ("PAMIR"). One example of a PAMIR is described in "A Discriminative Kernel-based Model to Rank Images from Text Queries" David Grangier, Samy Bengio, IEEE Transactions on Pattern Analysis and Machine Intelligence, vol. 30 (2008), pp. 1371-1384, which is incorporated herein by reference in its entirety.

PAMIR is a linear model that can be applied to infer non-linear decisions. PAMIR is implemented as a vector of weights, with each weight corresponding to a distinct visual term. The model is trained by iteratively computing dot products of the vector of weights representing the model and the sparse vectors representing the images. As described above, one of the images is an image that is identified as relevant to the query, while the other image is identified as relevant to at least one other query.

In some implementations, the image search subsystem 120 initializes the vector of weights to default values to begin the training process. For example, the image search subsystem 120 can assign the default values based on values of weights for a model that was trained for a similar query, or based on the values of weights for a model that was trained using similar training images. In other implementations, each of the weights can be assigned a default value of "0."

The image search subsystem 120 computes a dot product for the initialized image relevance model and each of the sparse vectors of the training images to generate training scores for each of the images. A distance (i.e., mathematical difference) between the training scores is computed. When a training score margin (i.e., a minimum distance) is identified for the training scores, the model is not adjusted and training scores for another pair of images are considered. When the training score margin is not for the training scores, the model is adjusted to increase the distance between the training scores, for example, by adjusting the vector of weights. The training score margin can be specified globally for all content features of the images and/or specified or altered for each individual content feature.

In some implementations, the vector of weights is adjusted such that the each weight is proportional to a minimum difference between the sparse vectors for the images. The vector of weights are also adjusted such that each weight is proportional to a maximum of a specified aggressiveness constant (i.e., a constant that controls a tradeoff between minimizing expected error of future iterations and maintaining low vector weights) and a ratio of the distance between the training scores and a Euclidean norm of a vector representing the difference between the sparse vectors.

The image search subsystem 120 iteratively repeats the training process until a training condition is satisfied. In some implementations, the training condition can require that the average number of adjustments of the vector of weights over a previous N iterations be below a threshold. For example, the training condition can specify that a trained model be a model that has been adjusted following no more than 10 of the last 10,000 iterations. In this example, a model having a vector of weights that has only been adjusted 9 out of the last 10,000 iterations can be identified as a trained model.

In other implementations, the training condition can specify that the average value adjustment of the vector of weights be less than a threshold amount. For example, the difference between weights of the vector prior to an iteration and following the iteration can be computed. The average difference over a previous N iterations can be computed. When the average difference is less than the threshold amount, the model is identified as trained.

Using Trained Image Relevance Models

In some implementations, the images search subsystem 120 applies a trained image relevance model for each query to the images available in the index cache 112. The image search subsystem 120 assigns an image relevance score to each image based on the application of the image relevance model to the content feature values of the image. The image relevance score is a relevancy measure of the image to the query. For example, an image having an image relevance score that is higher than the image relevance score of another image is considered more relevant to the query than the other image. The image relevance score that is assigned to each image can be a value resulting from application of the image relevance model for the query to the respective image. For example, the image relevance score of an image can be the dot product of the image relevance model a sparse vector representation of the content feature values of the image.

In some implementations, the image relevance score that is assigned to each image can be a combination of the value resulting from application of the image relevance model and other resource relevance or quality values. For example, the value resulting from application of the image relevance model can be combined with an IR score, a graph authority score, resource quality score, or other resource score that may be derived for a web page on which the image is displayed. The combination of the scores can be a function of the scores. For example, the combination can be a product of the scores, a weighted average of the scores, or another function based on the scores.

In some implementations, the image search subsystem 120 can adjust the image relevance scores so that image relevance scores associated with one query can be compared to image relevance scores associated with another query. For example, the image relevance scores for each query can be adjusted so that the mean image relevance score for each query is near a common value. Adjusting the image relevance scores so that the mean image relevance score for each query is near a common value provides a common reference point for determining the relative relevance of each image to different queries.

When a query originating from a user device is received, the image search subsystem 120 can access image relevance scores for images based on the query. Search results for the query are selected for presentation by the image search subsystem 120 based on the image relevance scores of the images. For example, images having a higher image relevance score can be selected for presentation at higher presentation positions in the search results than images having a lower image relevance score. Selecting image search results for presentation based on the image relevance scores of the images increases the likelihood that images that are more relevant will be referenced at higher presentation positions in the search results than less relevant images.

In some implementations, the order of the image search results can be adjusted based on the similarity of the images that are referenced by the image search results. For example, image relevance scores for images can be decreased when nearly identical images occupy each of the top N positions of the search results. The number N can selected based on user preferences, user feedback, the query logs 114 and click logs 116 or other historical or qualitative information. The image search subsystem 120 can identify images that are nearly identical to an image having a higher image relevance score than the nearly identical image, and reorder the search results so that the nearly identical images are more widely distributed.

The image search subsystem 120 can identify nearly identical images, for example, using clustering techniques. One example clustering technique is described in Ting Liu, Charles Rosenberg, Henry A. Rowley, "Clustering Billions of Images with Large Scale Nearest Neighbor Search," wacv, pp. 28, Eighth IEEE Workshop on Applications of Computer Vision (WACV'07), 2007. Other clustering techniques can also be used. When two or more nearly identical images are referenced within a minimum number of search results presentation positions of each other (e.g., 3 positions), the image search subsystem 120 can demote the nearly identical image(s) that are referenced in the lower presentation position(s) in the search results to even lower presentation position(s) of the search results. Demoting the nearly identical images that are referenced in the lower presentation positions of the search results enables other images that are not identified as nearly identical images to be referenced in higher presentation positions of the search result. Therefore, the top N presentation positions of the search results will reference more visually diverse images, in turn, increasing the likelihood that a user that submitted the query will be provided with a reference to an image that is relevant to the user's query.

Although the image relevance scores for a query are described as being calculated before the query is received by the search system 110, the image relevance scores need not be pre-calculated. In some implementations, the image search subsystem 120 can apply the image relevance model to the content feature values of images in response to receiving the query and, in turn, generate image relevance scores for the images based on the model and the content feature values of the images at query time.

Additional Example Processes

Figure 2:
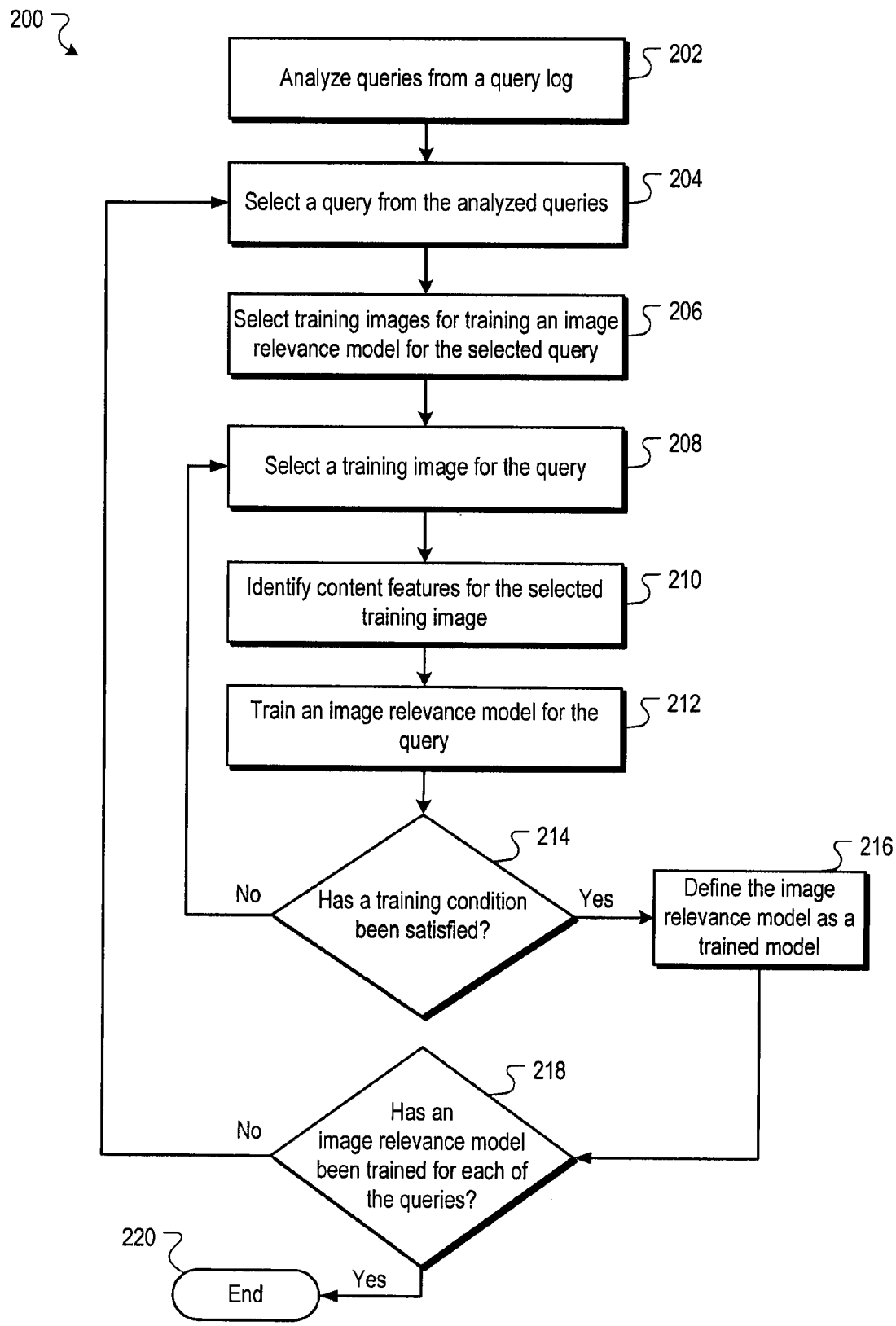
FIG. 2 is a flowchart of another example process for generating an image relevance model.

FIG. 2 is a flowchart of another example process (200) for generating an image relevance model. The example process (200) can be implemented by the image search subsystem 120.

Queries from a query log are analyzed (202). In some implementations, query data defines the queries. Each of the queries can correspond to a search query that was submitted by a user to a search system. The query data can be accessed, for example, in the query logs 114 and click logs 116 of FIG. 1.

A query is selected from the analyzed queries (204). The selected query can be selected, for example, by the image search subsystem 120.

Training images are selected for training an image relevance model for the selected query (206). In some implementations, the training images include a set of positive images that have at least minimum relevance measures relative to the selected query. The training images also include a set of negative images that have at least a minimum relevance to other unique queries. The relevance measure for each of the images in the set of positive images can be based on a number of selections of the image when provided in search results responsive to the selected query.

The relevance measure for each of the images in the set of negative images can be based on a number of selections of the image when provided in search results responsive to other unique queries. The relevance thresholds for the set of positive images and the set of negative images can be equal or independently defined. The training images can be identified, for example, by the image search subsystem 120.

Training images are selected for the selected query (208). The selected training images include an image selected from the set of positive training images and an image selected from the set of negative training images. The training images can be selected, for example, by the image search subsystem 120.

Content feature values are identified for the selected training images (210). In some implementations, each content feature value represents a characteristic of an aspect of the training image. The aspect of the training image can be identified from a localized subset of the image. For example, an image can be segmented using geometric boundaries for each portion of the image. The content feature values can be identified for each portion of a segmented image and the entire image. The content feature values can be identified from multiple scaled versions of the training images. The training images can be scaled, for example, by increasing the resolution (i.e., up sampling) the image or decreasing the resolution (i.e., sub sampling) the image. The content feature values can be identified, for example, by the image search subsystem 120.

An image relevance model for the selected query is trained (212). In some implementations, the image relevance model is a vector of weights that is trained based on the content feature values of the training image. Each weight in the vector of weights corresponds to an image feature and represents the relative importance of the value of the corresponding image feature to determining whether an image is relevant to the query. For example, an image feature having a higher corresponding weight is more important for determining whether an image is relevant to the query than an image feature having a lower corresponding weight.

The image relevance model can be trained by adjusting the weights of the vector of weights to increase the distance between respective values for positive and negative images for the query, as described above with reference to FIG. 1B. The image relevance model can be trained, for example, by the image search subsystem 120.

A determination is made whether a training condition has been satisfied (214). The determination can be performed, for example, based on whether a threshold number of adjustments have been made to the image relevance model over the past N training iterations, as described above with reference to FIG. 1B. The determination can be made, for example, by the image search subsystem 120.

When the training condition is not satisfied, another training image is selected for the query (208) and the process is repeated. When the training condition is satisfied, the image relevance model is defined as a trained model (216). A trained image relevance model can be used to select images that are relevant to a query.

A determination is made whether an image relevance model has been generated for each of the queries (218). The determination can be made, for example, by the image search subsystem 120. If an image relevance model has not been generated for each of the queries, another query is selected (204). If an image relevance model has been generated for each query, the process (200) ends (220). The determination can be made, for example, by the image search subsystem 120.

Figure 3:
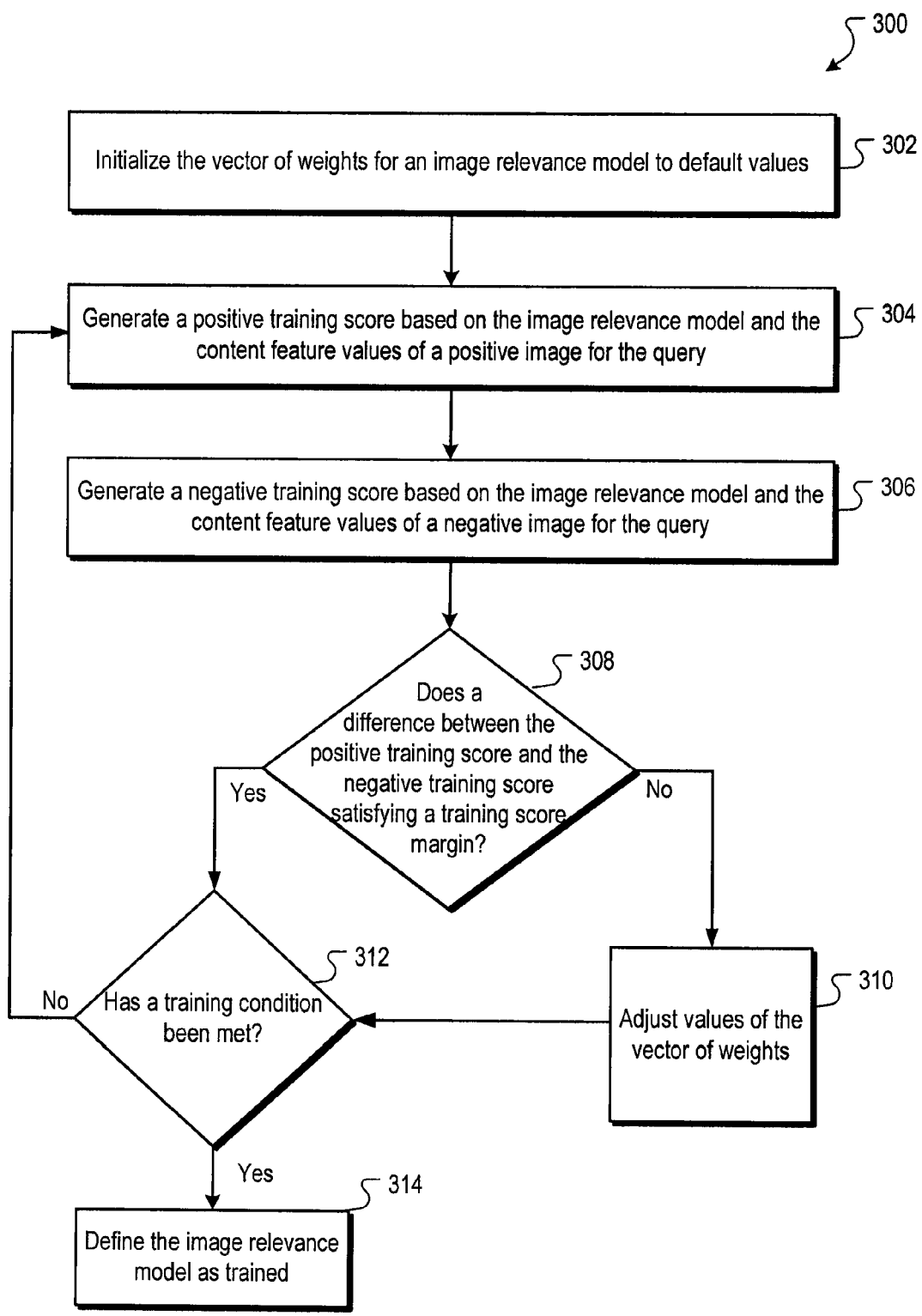
FIG. 3 is a flowchart of an example process for training an image relevance model that includes a vector of weights corresponding to content feature values of images.

FIG. 3 is a flowchart of an example process (300) for training an image relevance model that includes a vector of weights corresponding to the content features of images. The example process (300) can be implemented, for example, by the image search subsystem 120.

The vector of weights for an image relevance model is initialized to default values (302). In some implementations, each weight in the vector of weights for the image relevance model corresponds to a content feature of an image. The default values can be based on the values of weights for an image relevance model that was trained for a similar query, or based on the values of weights for a model that was trained using similar training images. Each value in the vector of weights can also be set to a default value of "0." The vector of weights can be initialized to default values, for example, by the image search subsystem 120.

A positive training score is generated based on the image relevance model and the content feature values of a positive image for the query (304). In some implementations, positive images are identified as being relevant to the query for which the image relevance model is being trained. The positive training score can be, for example, a result of a dot product of the image relevance model and the content feature values of the positive image. The positive training score can be generated, for example, by the image search subsystem 120.

A negative training score is generated based on the image relevance model and the content feature values of a negative image for the query (306). In some implementations, negative images are relevant to other unique queries that are different from the query for which the relevance model is being trained. Negative images are not precluded from being relevant to the query for which the relevance model is being trained, but are selected based on their relevance to other unique queries. The negative training score can be, for example, a result of dot product of the image relevance model and be content feature values of the negative image. The negative training score can be generated, for example, by the image search subsystem 120.

A determination is made whether a difference between the positive training score and the negative training score satisfy a training score margin (308). In some implementations, the difference between a pair of images is determined based on a function of the positive score and the negative score. For example, the difference between the positive score and the negative score can be the absolute value of the negative training score subtracted from the absolute value of the positive training score. If this difference meets or exceeds the training score margin, the difference satisfies the training score margin. The training score margin can be, for example, an absolute value (e.g., 1.0) or a percentage difference between the two training scores (e.g., 40% difference). The determination can be made, for example, by the image search subsystem 120.

When the difference between the positive training score and the negative training score do not satisfy the training score margin, the values of the vector of weights are adjusted (310). The values of the vector of weights can be adjusted, for example, based on machine learning techniques, as described above with reference to FIG. 1B. The values of the vector of weights can be adjusted, for example, by the image search subsystem 120.

When the difference between the positive training score and the negative training score satisfy the training score margin or after the values of the vector of weights are adjusted, a determination is made whether a training condition has been met for the image relevance model (312). In some implementations, the training condition can require that the average number of adjustments of the vector of weights over a previous N iterations be below a threshold. For example, the training condition can specify that a trained model be a model that has been adjusted following no more than 10 of the last 10,000 iterations. In this example, a model having a vector of weights that has only been adjusted 9 out of the last 10,000 iterations the training condition is met.

In other implementations, the training condition can specify that the average value adjustment of the vector of weights be less than a threshold amount. For example, the difference between weights of the vector prior to an iteration and following the iteration can be computed. The average difference over a previous N iterations can be computed. When the average difference over the previous N iterations is less than the threshold amount, the training condition is met.

When the training condition has not been met, the process iteratively repeats by generating a positive training score based on the image relevance model and the content feature values of positive images for the query (304). When the training condition has been met, the image relevance model is defined as trained (314). The image relevance model can be defined as trained, for example, by the image search subsystem 120.

Figure 4:
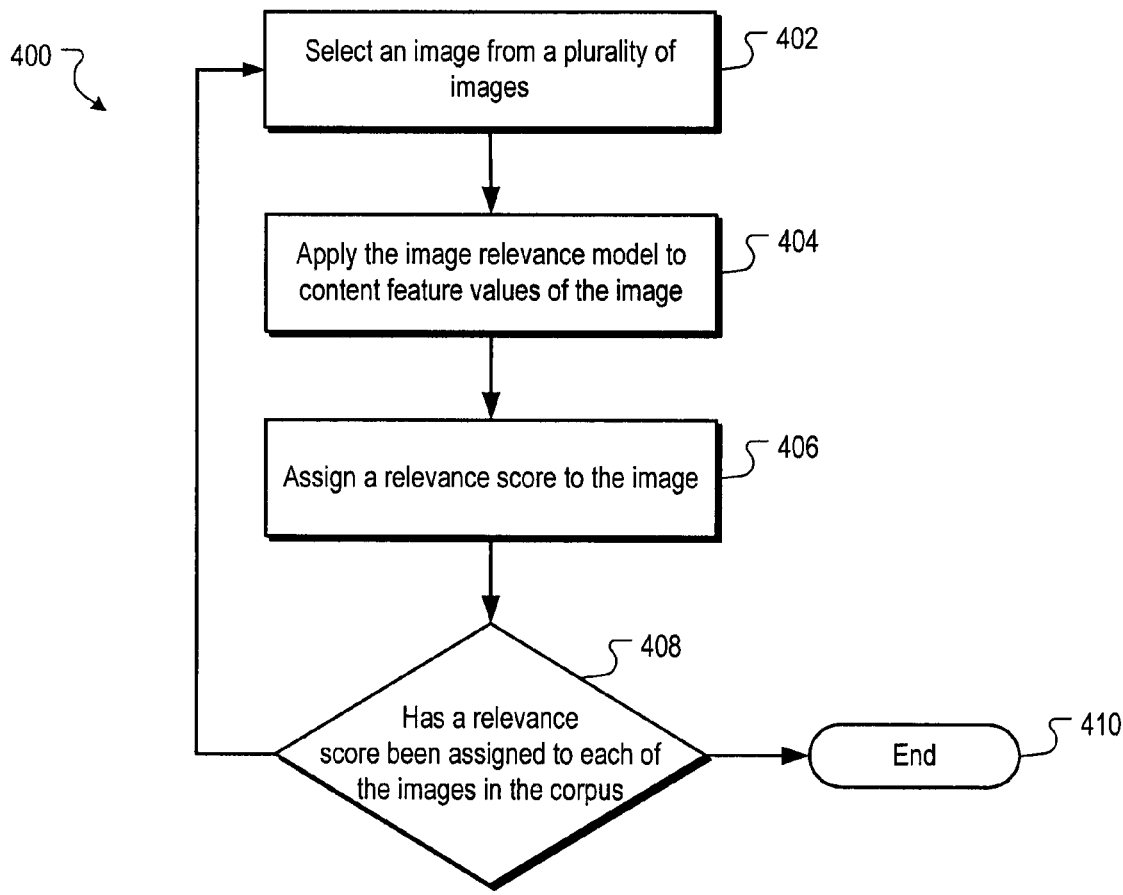
FIG. 4 is a flowchart of an example process for ordering image search results.

FIG. 4 is a flowchart of an example process (400) for selecting images to reference in image search results. The example process (400) can be implemented, for example, by the image search subsystem 120.

An image is selected from a corpus of images (402). In some implementations, the corpus of images is an index of available images stored in a data store. The image can be selected, for example, by the image search subsystem 120.

The image relevance model is applied to the content feature values of the image (404). In some implementations, application of the image relevance model to the content feature values includes determining a dot product of the image relevance model and the content feature values. The image relevance model can be applied to the content feature values of the image, for example, by the image search subsystem 120.

A relevance score is assigned to the image (406). In some implementations, the relevance score is based on the application of the relevance model to the content feature values. The relevance score measures the relevance of the image to the query. The assigned image relevance score can be the value that results from application of the image relevance model to the content feature values, or alternatively, a function of the resulting value. In some implementations, the assigned relevance score is a combination of the value resulting from application of the image relevance model and a value based on the other relevance models, as described above with reference to FIG. 18. The relevance score can be assigned to the image, for example, by the image search subsystem 120.

A determination is made whether a relevance score has been assigned to each of the plurality of images (408). The determination can be made, for example, by the image search subsystem 120.

When a relevance score has not been assigned to each of the plurality of images, another image is selected from the plurality of images (402).

When a relevance score has been assigned to each of the plurality of images, the process ends (410).

Figure 5:
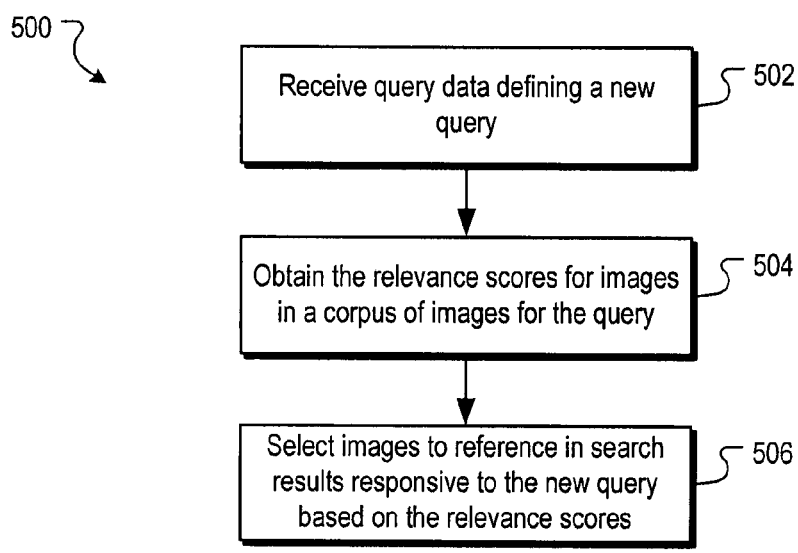
FIG. 5 is a flowchart of an example process for ordering image search results.

FIG. 5 is a flowchart of an example process (500) for selecting images for reference in image search results. Query data defining a new query is received (502). The new query can be, for example, an image search query submitted by a user. The query data can be received, for example, by the image search subsystem 120.

The relevance scores for images in a corpus of images for the new query are obtained (504). In some implementations, the relevance scores of the images are obtained to identify images that are relevant to the new query. The relevance scores are a measure of the relevance of the images to the new query. For example, an image having a relevance score that is higher than the relevance score of another image is more relevant to the new query than the other image. The relevance scores can be accessed, for example, by the image search subsystem 120.

Images are selected for reference in search results responsive to the new query based on the relevance scores (506). In some implementations, images having a higher relevance score or selected for reference at higher presentation positions of the image search results than images having a lower image relevance score.

In some implementations, the presentation positions at which the images are referenced can be adjusted based on the identification of nearly identical images. For example, an image that is nearly identical to another image having a higher image relevance score to the new query can have its image relevance score lowered or otherwise selected for presentation at a lower position of the image search results. The images can be selected for reference in image search results, for example, by the image search subsystem 120.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method, comprising:
   identifying a plurality of queries, each of the queries being a unique set of one or more query terms received by a search system as a query input;
   for each of the queries:
      selecting training images for training an image relevance model, the training images comprising:
         a first image having a first relevance measure, for the query, that satisfies a first relevance threshold; and
         a second image having a second relevance measure, for a different query in the plurality of queries, that satisfies a second relevance threshold;
      for each of the training images, identifying content feature values, each content feature value representing a characteristic of an aspect of the training image; and
      training the image relevance model to generate relevance measures of content feature values of images to the query based on the content feature values of the training images, wherein the image relevance model comprises a vector of weights corresponding to the content feature values, the training comprising:
         initializing the vector of weights to default values;
         generating a first training score based on the image relevance model and the content feature values of the first image;
         generating a second training score based on the image relevance model and the content feature values of the second image;
         comparing the first training score and the second training score;
         in response to a difference between the first training score and the second training score not satisfying a training score margin, adjusting values of the vector of weights;
         determining whether a training condition has occurred; and
         repeating the selecting training images, the generating the first training score, the generating the second training score and the comparing when the training condition has not occurred.

2. The method of claim 1, wherein the first relevance measure is based on selections of the first image when provided in response to the query.

3. The method of claim 1, wherein the second relevance measure is based on selections of the second image when provided in response to the different query.

4. The method of claim 1, wherein generating a first training score comprises: determining a dot product of the vector of weights and the content feature values of the first image.

5. The method of claim 1, wherein generating a second training score comprises: determining a dot product of the vector of weights and the content feature values of the second image.

6. The method of claim 1, further comprising:
for each query:
identifying a plurality of images;
for each image:
applying the image relevance model to content feature values of the image; and
assigning an image relevance score to the image based on an application of the image relevance model to the content feature values, the image relevance score being a relevancy measure of the image to the query.

7. The method of claim 6, wherein applying the image relevance model to the content feature values comprises determining a dot product of the image relevance model and the content feature values.

8. The method of claim 6, further comprising:
receiving second query data defining a query; and
obtaining the image relevance scores of the images for the query to identify a third plurality of images that are relevant to the query based on the image relevance model and content feature values.

9. The method of claim 6, further comprising for each query, selecting images for reference in image search results responsive to the query based on the image relevance score.

10. The method of claim 9, wherein selecting images comprises selecting images for reference in image search results based on a similarity to previously selected images.

11. The method of claim 1, wherein identifying content feature values comprises identifying content feature values from each of a plurality of scaled versions of the training images.

12. The method of claim 1, wherein the first relevance threshold and the second relevance threshold are equal.

13. A system, comprising:
a first data store storing query data, the query data defining a plurality of queries;
one or more processors that interact with the first data store and perform operations comprising:
identifying a query defined by the query data;
selecting training images for training an image relevance model, the training images comprising:
a first image having a first relevance measure, for the query, that satisfies a first relevance threshold; and
a second image having a second relevance measure, for a different query in the plurality of queries, that satisfies a second relevance threshold;
for each of the training images, identifying content feature values, each content feature value representing a characteristic of an aspect of the training image; and
training the image relevance model to generate relevance measures of content feature values of images to the query based on the content feature values of the training images, wherein the image relevance model comprises a vector of weights corresponding to the content feature values, the training comprising:
initializing the vector of weights to default values;
generating a first training score based on the image relevance model and the content feature values of the first image;
generating a second training score based on the image relevance model and the content feature values of the second image;
comparing the first training score and the second training score;
in response to a difference between the first training score and the second training score not satisfying a training score margin, adjusting values of the vector of weights;
determining whether a training condition has occurred; and
repeating the selecting training images, the generating the first training score, the generating the second training score and the comparing when the training condition has not occurred.

14. The system of claim 13, wherein the first relevance measure is based on selections of the first image when provided in response to the query.

15. The system of claim 13, wherein the second relevance measure is based on selections of the second image when provided in response to the different query.

16. The system of claim 13, wherein the one or more processors perform operations comprising assigning an image relevance score to each of a plurality of images based on the image relevance model and the content feature values of the images, the image relevance score being a relevancy measure of the image to the query.

17. The system of claim 16, wherein the image relevance score for each image is based on a dot product of the image relevance model and the content feature values of the image.

18. The system of claim, 16 wherein the one or more processors perform operations comprising selecting images to reference in image search results based on the image relevance scores.

19. A non-transitory computer readable medium encoded with a computer program comprising instructions that when executed operate to cause a computer to perform operations:
identifying a plurality of queries, each of the queries being a unique set of one or more query terms received by a search system as a query input;
for each of the queries:
selecting training images for training an image relevance model, the training images comprising:
a first image having a first relevance measure, for the query, that satisfies a first relevance threshold; and
a second image having a second relevance measure, for one or more different queries in the plurality of queries, that satisfies a second relevance threshold;
for each of the training images, identifying content feature values, each content feature value representing a characteristic of an aspect of the training image; and
training the image relevance model to generate relevance measures of content feature values of images, for the query, based on the content feature values of the training images, wherein the image relevance model comprises a vector of weights corresponding to the content feature values, the training comprising:
initializing the vector of weights to default values;
generating a first training score based on the image relevance model and the content feature values of the first image;
generating a second training score based on the image relevance model and the content feature values of the second image;
comparing the first training score and the second training score;

in response to a difference between the first training score and the second training score not satisfying a training score margin, adjusting values of the vector of weights;

determining whether a training condition has occurred; and repeating the selecting training images, the generating the first training score, the generating the second training score and the comparing when the training condition has not occurred.

* * * * *

UNITED STATES PATENT AND TRADEMARK OFFICE
CERTIFICATE OF CORRECTION

PATENT NO. : 8,515,212 B1  
APPLICATION NO. : 12/505287  
DATED : August 20, 2013  
INVENTOR(S) : Samy Bengio et al.

Page 1 of 1

It is certified that error appears in the above-identified patent and that said Letters Patent is hereby corrected as shown below:

Title Page, item (56), Other Publications

Column 2, Line 12 – delete "Kernal" and insert -- Kernel --, therefor.

Column 2, Line 15 – delete "Kernal" and insert -- Kernel --, therefor.

In the Claims

Claim 18, Column 18, Line 34 – delete "claim, 16" and insert -- claim 16, --, therefor.

Signed and Sealed this  
Thirty-first Day of December, 2013

Margaret A. Focarino  
*Commissioner for Patents of the United States Patent and Trademark Office*